June 17, 1958

R. M. JONES ET AL 2,839,654

LUNCH BOX WITH HEATING UNIT

Filed Aug. 7, 1956

Richard M. Jones
Dollin L. Robinson, Jr.
INVENTORS.

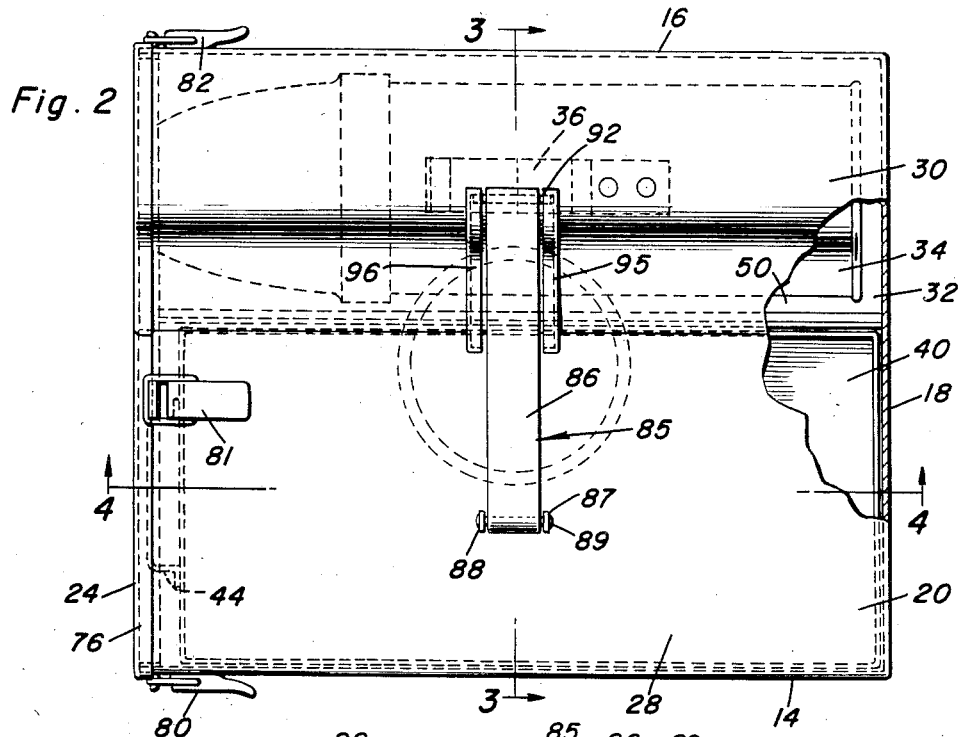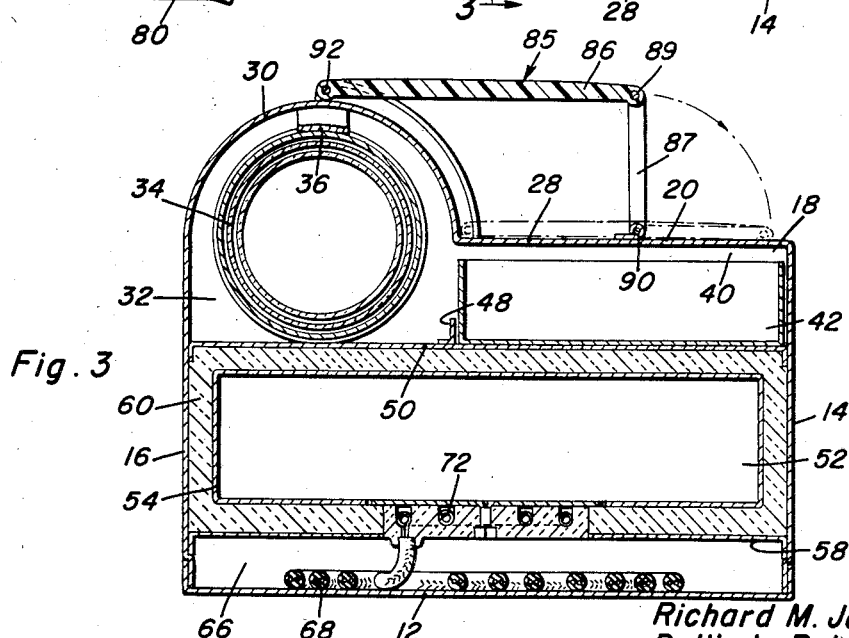

United States Patent Office 2,839,654
Patented June 17, 1958

2,839,654
LUNCH BOX WITH HEATING UNIT

Richard M. Jones and Dollin L. Robinson, Jr., Long Beach, Calif.

Application August 7, 1956, Serial No. 602,618

3 Claims. (Cl. 219—35)

This invention relates to improvements in lunch boxes and more particularly to a lunch box which is provided with compartments for various purposes.

An object of the present invention is to provide a lunch box of the portable type which has means to carry and heat frozen food dinners, lunches and the like; for example, such dinners and lunches which consist of trays in which frozen food articles are supported, the trays being packaged for sale on the open market. The lunch box will also heat other frozen foods, such as desserts, pies, certain beverages and the like. It has space provided for bread, vegetables, an insulated bottle, such as those sold under the trade name "Thermos." Even though these are the suggested articles that are to be handled with the lunch box, it is apparent that other uses as will occur to those skilled in the art will be equally as satisfactory.

An article made in accordance with the invention is preferably composed of aluminum or any other lightweight metal or good grade of plastic. An electric heater is used for the purpose of heating the food. It is intended that the lunch box be useful by the everyday worker who carries his cold lunch and cannot possibly have a hot lunch. Moreover, a worker can also save a considerable amount of time in preparing his lunch in the mornings before work, instead of having to fix sandwiches which will be cold and not as tasty as a hot luncheon. The worker will be able to put a frozen prepared lunch taken directly from his freezer or refrigerator into the lunch box, together with a beverage containing insulated bottle, and will be ready to leave for work. Approximately 20 to 30 minutes before lunch time, the heating unit is energized by merely plugging in the line cord. Thereafter, a delicious piping hot lunch will be ready for the worker. Accordingly, it is a further object of the present invention to provide a lunch box having an oven which is insulated from other compartments, all of the compartments being accessible by opening one end closure of the lunch box, whereby the oven, the bread tray, the insulated liquid containing bottle and line cord compartments are all accessible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a top plan view of the lunch box in Figure 1;

Figure 3 is a transverse sectional view taken on the line 3—3 of Figure 2;

Figure 1:
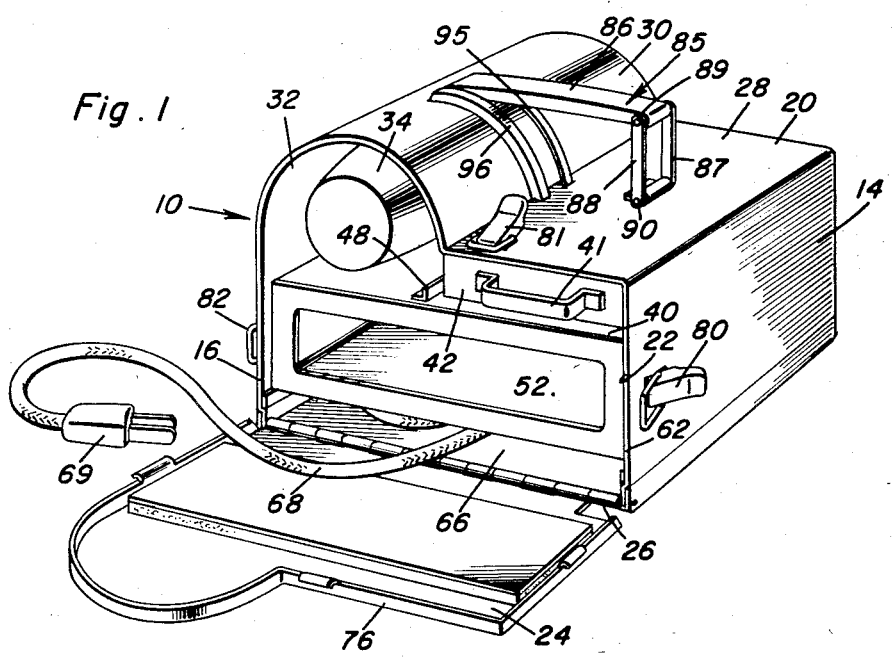
Figure 1 is a perspective view of a lunch box made in accordance with the invention.
Figure 4:
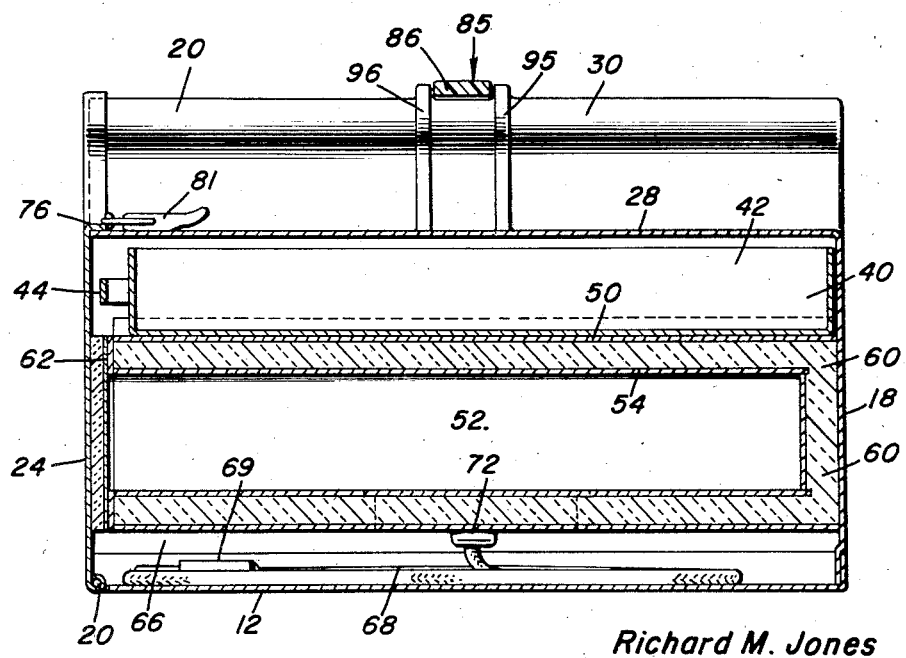
Figure 4 is a sectional view taken on the line 4—4 of Figure 2.

In the accompanying drawings there is a lunch box 10 which is constructed in accordance with the principles of the invention. This lunch box was made of lightweight metal, plastic or other suitable material which is sufficiently strong but yet which is not heavy. The lunch box consists of a bottom 12, two sides 14 and 16, a back 18, and a top wall 20. The container from which the lunch box is made has an open front 22 that is closed by means of closure 24, the latter being hinged by piano hinge 26 or an equivalent on the bottom front edge of bottom 22. Top wall 20 has a flat portion 28 and a semicylindrical part 30 in order to form the insulated bottle compartment 32. The insulated bottle 34 is held in place by means of a spring 36 which is preferably a flat leaf spring attached to the top inner surface of the semicylindrical part 30 of top wall 20. It presses onto the outer surface of the insulated bottle 34 when the latter is inserted in the open front of compartment 32.

There is a compartment 40 located adjacent to the compartment 32, compartment 40 preferably having the tray 42 slidably disposed therein and functioning as a drawer. Therefore, handle 44 is placed on the front wall of the tray 42 and becomes immediately accessible upon opening the closure 24. An upwardly extending angle 48 is attached to horizontal wall 50, the latter being secured to the sides 14 and 16 between the upper and lower edges thereof. Compartment 40 is adapted to contain bread, pies and other articles of foodstuff.

Wall 50 is common to compartments 32, 40 and compartment 52 which functions as an oven. It forms the bottom wall of the first two mentioned compartments and a part of the top wall for oven 52. This oven is made of an inner casing 54 secured in the container beneath wall 50 and above wall 58 which is also secured to sides 14 and 16 and is parallel to wall 50. Insulation 60 completely encircles the four sides and back of the oven compartment 52, and there is a molding 62 around the front thereof. The front part of the oven compartment is open as is the compartment therebelow.

Compartment 66 is located below the oven 52 and functions to support the line or electrical cord 68 having a plug 69 at one end thereof which is adapted to be connected with a source of electrical energy. The opposite end of the line is attached to the electric heating element 72 which is in wall 58 and which is exposed to the bottom of the oven in order to supply heat thereto.

In as much as the top wall 20 has a flat and a semicylindrical part, the closure 24 is shaped to conform thereto. In addition, it has flange 76 around the periphery thereof in order to clamp over or within the edge of the walls of the container to form a tight seal. Three trunk latches 80, 81, and 82 are carried by the sides and top of the container and by the closure 24 so as to releasably attach the closure in the closed position. Upon opening the latches, the closure is swung downwardly in order to expose the entire interior of the lunch box.

A handle 85 is operatively connected with the top 20 of the container and consists of a flat handle member 86 having a pair of links 87 and 88 at one end which are connected by pivot pin 89 thereto and by pivot pin 90 to the flat part of top 20. The opposite end of the handle member 86 is slidably connected to the semicylindrical part of the top 20 by means of a pin 92 passed through a bearing in the opposite end of handle member 86 and disposed in the two rails 95 and 96 which coact to form a track at one side of the semicylindrical part 30 of the top 20. Accordingly, the handle will be raised to the operative carrying position by merely pulling it upwardly. This causes the links 87 and 88 to pivot upwardly and causes the pin 92 to slide in the track made by rails 95 and 96. In order to depress the handle it is merely released or given a slight downward push, the links 87 and 88 folding downwardly and the pin 92 sliding down in the curved rails of the track.

In use of the lunch box there is no limitation imposed. A suggested use has been described that is in connection with frozen foods and beverages which are to be maintained either hot or cold. However, other uses will occur to those skilled in the art. For example, instead of frozen food, or in addition to frozen food, sandwiches which are better heated than cool (hamburger, frankfurter) may be used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lunch box comprising a container having walls and a door, an insulated oven having a heating element, a food storage compartment above said oven having one wall common to said oven, a liquid bottle compartment in said container and alongside of said storage compartment, a handle on the container top wall and including a handle member with two ends, a link connecting one end to said top wall above said storage compartment, and means slidably connecting the other end of said handle member to said top wall so that the handle is movable to an inoperative position flush against said top wall, said heating element being of the electrical type, an electric wire connected thereto, and a wire storage compartment in said container.

2. The lunch box of claim 1 wherein said liquid bottle compartment and said food storage compartment are in side by side relationship, said oven is superposed with respect to said compartments, said wire storage compartment is superposed with respect to said oven and said storage and liquid bottle compartment, said oven and each of said compartments having entrances at the corresponding end, said door when opened giving access to each of said compartments and closing the open ends of said compartments when in the closed position.

3. The lunch box of claim 2 wherein the part of said top wall which partially encloses said bottle compartment is curved in cross-section, and said means slidably connecting said other end of said handle member to said top wall including a track carried by the curved part of said top wall, a pin carried by said handle member and captive in said track and slidable thereon so that said handle member has one end which moves in an arcuate path when the handle member is adjusted from the open usable position to the closed inoperative position.

References Cited in the file of this patent
UNITED STATES PATENTS

| | | |
|---|---|---|
| 400,752 | Crossman | Apr. 2, 1889 |
| 1,411,032 | Jenkins | Mar. 28, 1922 |
| 2,019,426 | Mabry | Oct. 29, 1935 |
| 2,214,632 | Brown, Jr. | Sept. 10, 1940 |
| 2,274,285 | Walker | Feb. 24, 1942 |
| 2,458,837 | Dougherty | Jan. 11, 1949 |
| 2,505,405 | Jarboe | Apr. 25, 1950 |
| 2,513,218 | Turnipseed | June 27, 1950 |
| 2,615,541 | Whitesel | Oct. 28, 1952 |